US012731517B2

(12) United States Patent
Meng et al.

(10) Patent No.: US 12,731,517 B2
(45) Date of Patent: Sep. 8, 2026

(54) DISPLAY AND DATA CONFIGURATION METHOD THEREOF

(71) Applicant: WISTRON CORPORATION, New Taipei City (TW)

(72) Inventors: Qiang Meng, New Taipei City (TW); Chih Chou Chou, New Taipei City (TW); Junxin Qiu, New Taipei City (TW); Yongqiang Li, New Taipei City (TW)

(73) Assignee: WISTRON CORPORATION, New Taipei City (TW)

( * ) Notice: Subject to any disclaimer, the term of this patent is extended or adjusted under 35 U.S.C. 154(b) by 221 days.

(21) Appl. No.: 18/629,385

(22) Filed: Apr. 8, 2024

(65) Prior Publication Data

US 2025/0273111 A1 Aug. 28, 2025

(30) Foreign Application Priority Data

Feb. 23, 2024 (CN) ........................ 202410208697.5

(51) Int. Cl.
*G09G 3/20* (2006.01)

(52) U.S. Cl.
CPC ... *G09G 3/2003* (2013.01); *G09G 2320/0666* (2013.01); *G09G 2320/0693* (2013.01); *G09G 2370/04* (2013.01)

(58) Field of Classification Search
CPC ......... G09G 3/2003; G09G 2320/0666; G09G 2320/0693
See application file for complete search history.

(56) References Cited

U.S. PATENT DOCUMENTS 7,068,323 B2 * 6/2006 Lee .................... H04N 21/4856 348/569
7,966,044 B2 6/2011 Hashimoto et al.
(Continued)

FOREIGN PATENT DOCUMENTS

CN 101006421 A 7/2007
CN 102447862 A 5/2012
(Continued)

OTHER PUBLICATIONS

Office Action of Taiwan patent application No. 113107932 issued May 14, 2025, 14 pages.
(Continued)

*Primary Examiner* — Eric T Oberly
(74) *Attorney, Agent, or Firm* — BROOKS KUSHMAN P.C.

(57) ABSTRACT

A display data configuration method includes: recording, by a burner, first font data to a storage device basing on a first address; conducting a calibration test on the display; after the display completes the calibration test, generating an identifier corresponding to the display by an electronic device, wherein the identifier is generated based on a network address and the network address is configured to access equipment data of the display; generating second font data according to the identifier by the electronic device; and storing the second font data to the storage device of the display basing on a second address, where the first font data and the second font data are configured to show an On Screen Display menu including the identifier on a display module of the display.

9 Claims, 8 Drawing Sheets

(56) References Cited

U.S. PATENT DOCUMENTS

| | | | | |
|---|---|---|---|---|
| 10,366,674 | B1 * | 7/2019 | Levin | G09G 5/10 |
| 2005/0212808 | A1 | 9/2005 | Lin et al. | |
| 2007/0052735 | A1 * | 3/2007 | Chou | H04N 17/04 348/E17.005 |
| 2010/0103319 | A1 * | 4/2010 | Li | H04N 5/44504 348/569 |
| 2012/0056911 | A1 * | 3/2012 | Safaee-Rad | H04N 23/83 345/690 |
| 2013/0076982 | A1 * | 3/2013 | Bai | H04N 21/4755 348/E5.105 |
| 2020/0219439 | A1 * | 7/2020 | Wu | G09G 3/3208 |
| 2023/0195397 | A1 * | 6/2023 | Kado | G06K 19/06037 715/705 |

FOREIGN PATENT DOCUMENTS

| | | | |
|---|---|---|---|
| CN | 104471563 | A | 3/2015 |
| CN | 114651300 | A | 6/2022 |
| TW | 594557 | B | 6/2004 |
| TW | I348619 | B | 9/2011 |

OTHER PUBLICATIONS

Office Action dated Sep. 23, 2025 of Taiwan patent application No. 113107932 dated Sep. 23, 2025, 18 pages.

* cited by examiner

DISPLAY AND DATA CONFIGURATION METHOD THEREOF

CROSS-REFERENCE TO RELATED APPLICATIONS

This application claims the priority and benefit of Chinese Patent Application No. 202410208697.5, filed on Feb. 23, 2024, the disclosure of which is hereby incorporated in its entirety by reference herein.

BACKGROUND

1. Technical Field

The present disclosure relates to a display and related information, particularly to a display and a data configuration method of the display.

2. Related Art

Currently, most displays on the market come with printed documents in the packaging, such as Quick Start Guides (QSG), labels, color calibration reports (such as Delta E, Brightness Uniformity (BU), Color Uniformity (CU)), etc.

However, these printed documents are prone to being lost as users may casually misplace them, and some users may even dispose of them along with the cardboard box without reading, making it difficult to find when needed. This not only contributes to environmental waste but also diminishes the benefits of having these printed documents.

On the other hand, major display brands now encourage downstream manufacturers to achieve green and energy-saving practices when quoting new products. Therefore, providing a convenient way for users to access and use electronic versions of these printed documents, would better fulfill green and energy-saving objectives.

SUMMARY

According to one or more embodiment of the present disclosure, a data configuration method of a display comprises: recording, by a burner, first font data to a storage device of the display basing on a first address; conducting, by the display, a calibration test; after the calibration test, generating, by an electronic device, an identifier corresponding to the display, wherein the identifier is generated based on a network address, and the network address is configured to access equipment data of the display; generating, by the electronic device, second font data according to the identifier; and storing, by the electronic device, the second font data to the storage device of the display basing on a second address, wherein the first font data and the second font data are configured to present an On Screen Display (OSD) menu comprising the identifier on the display.

According to one or more embodiment of the present disclosure, a display, comprises a display module, a storage device, and a scalar integrated circuit. The storage device is configured to store first font data and second font data. The scalar integrated circuit electrically connects to the display module and the storage device. The scalar integrated circuit loads the first font data and the second font data from the storage device, displays an On Screen Display (OSD) menu on the display module according to the first font data, and presents an identifier in the OSD menu according to the second font data, wherein the identifier is generated based on a network address, and the network address is configured to access equipment data of the display.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
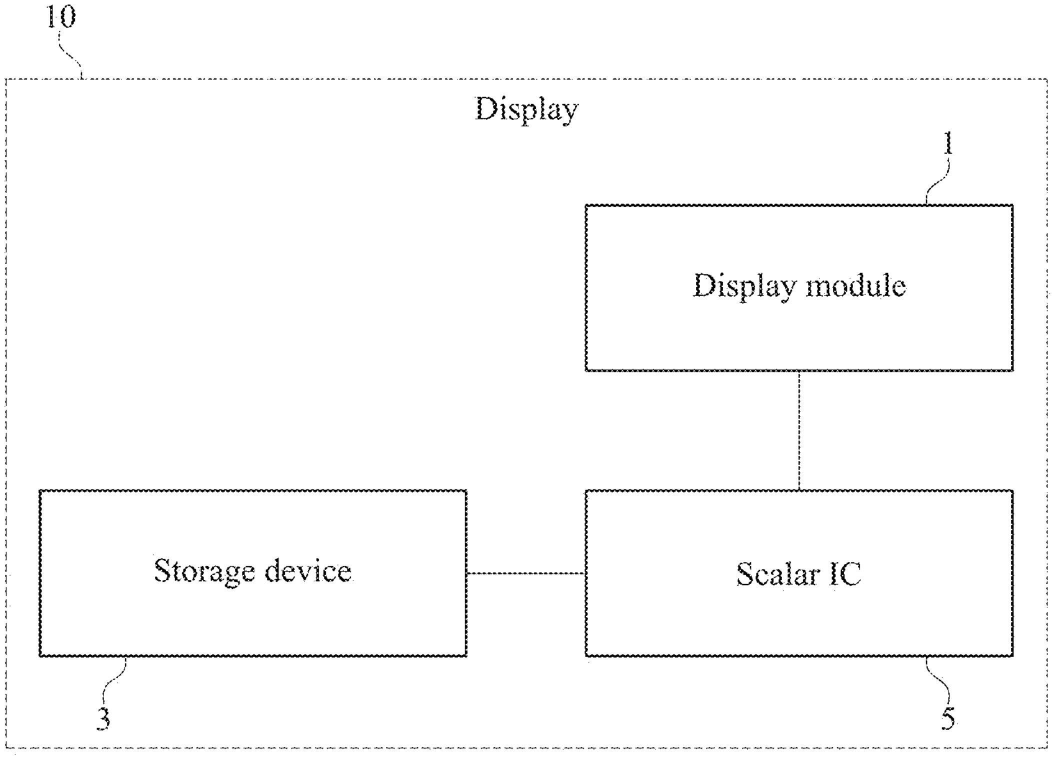
FIG. 1 is a block diagram of the structural framework of a display according to an embodiment of the present disclosure.

FIG. 1 is a block diagram of the structural framework of a display according to an embodiment of the present disclosure. As shown in FIG. 1, the display 10 in an embodiment of the present disclosure includes a display module 1, a storage device 3, and a scalar integrated circuit (IC) 5, where the scalar IC 5 is electrically connected to the display module 1 and the storage device 3.

In an embodiment, the display module 1 may be any type of display panel, such as a liquid crystal display (LCD) screen or a touchscreen, and the present disclosure does not limit the hardware type of the display module 1.

The storage device 3 is configured to store first font data required for an On Screen Display (OSD) menu and second font data required for an identifier. In an embodiment, the storage device 3 is a flash memory, but the present disclosure does not limit the hardware type of the storage device 3, and the storage device 3 may also be a read-only memory (ROM), programmable ROM (PROM), electrically programmable ROM (EPROM), or electrically erasable and programmable ROM (EEPROM). In an embodiment, the identifier is a Quick Response code (QR code), but the present disclosure does not limit the specification of the identifier. The identifier is associated with a network address, which is configured to access equipment data of the display 10. In an embodiment, the equipment data includes but is not limited to at least one of a calibration report, a manual, a quick start guide, a quick repair tutorial videos, an instructional video and a driver. In an embodiment, the calibration report is color calibration data, generated during a production line stage of the display 10. This production line stage involves color calibration of the display 10 to produce color calibration data. Additionally, the production line stage is entered after the burner records the first font data to the storage device 3 of the display 10.

Figure 2:
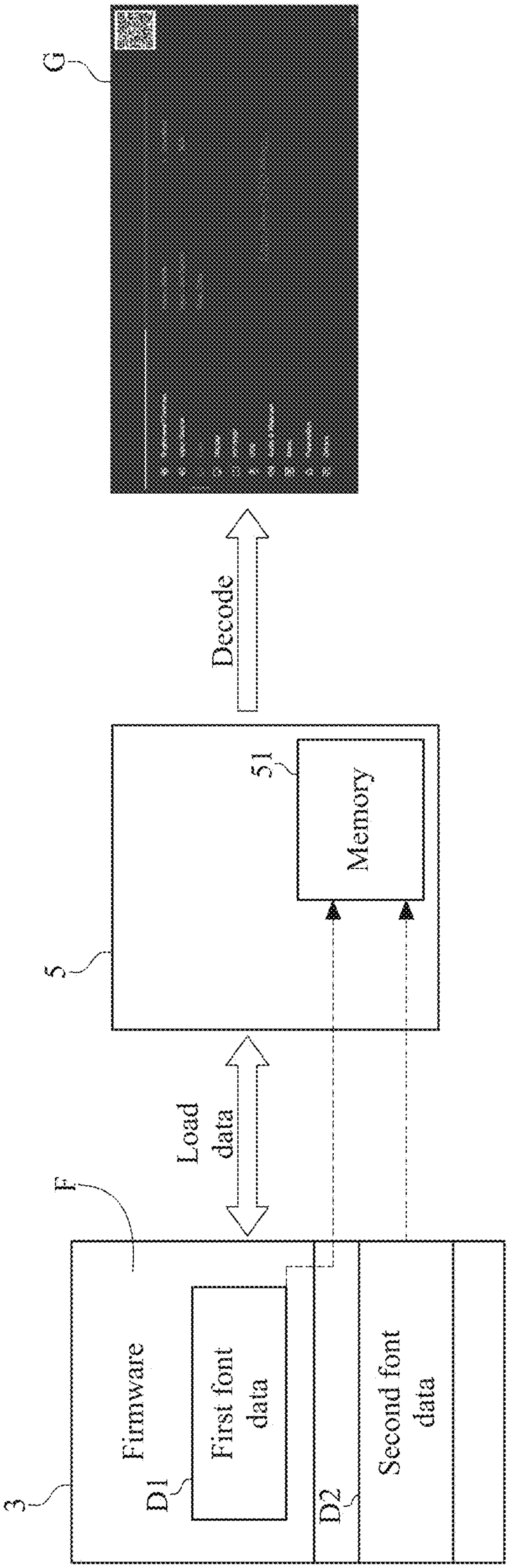
FIG. 2 is a schematic diagram of the loading of first and second font data to display an On Screen Display (OSD) menu and an identifier.

The scalar IC 5 dynamically loads the first font data and the second font data from the storage device 3. The scalar IC 5 displays the OSD menu on the display module 1 according to the first font data, and presents the identifier in the OSD menu according to the second font data. Please refer to FIG. 2 for an illustration corresponding to the above content. FIG. 2 is a schematic diagram of the loading of first and second font data to display the OSD menu and the identifier. By loading the first font data and second font data, the OSD menu G with a QR code may be generated. In an embodiment, the second font data is presented in the form of the QR code in the OSD menu. In an embodiment, the OSD menu combines the display of the first font data and the QR code. In an embodiment, the scalar IC 5 is, for example, an Application Specific Integrated Circuit (ASIC) or a System-on-a-Chip (SOC), and the present disclosure does not specifically limit the hardware type of the scalar IC 5.

Generally, the OSD menu G may list various settings of the display 10 that can be adjusted. Users may adjust or preview the relevant functions and parameters of the display 10 through button controls. The presentation of the OSD menu G on the display 10 differs from displaying a regular image (such as in JPG format). As shown in FIG. 2, the scalar IC 5 of the display 10 controls the display module 1 to draw the OSD menu G according to the first font data D1. Here, the term "font" refers to the smallest unit composing the OSD menu G, which is composed of multiple different fonts.

Figure 3:
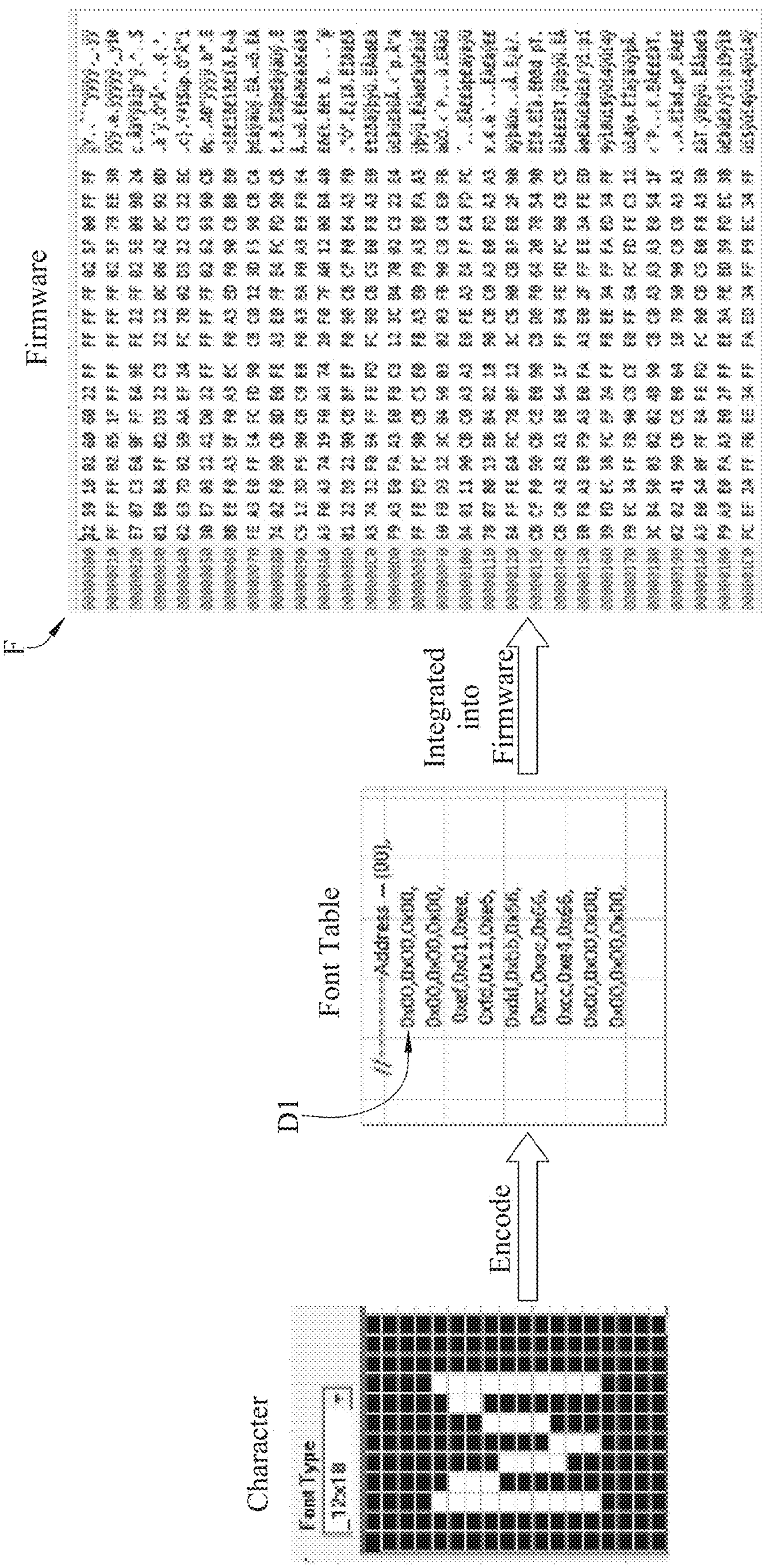
FIG. 3 is a schematic diagram of the relationship between characters, font data, and firmware.

Please refer to FIG. 3. Taking an example of a character "M" in the OSD menu G, its size may be, for instance, 12 pixels×18 pixels. Through specific rules, the character may be encoded into a font table consisting of 27 bytes, and this font table is then integrated into the firmware F stored in the storage device 3. When the display 10 is powered on, the firmware F is loaded, and the font table is written into the memory 51 of the scalar IC 5. When the scalar IC 5 executes the function of generating the OSD menu G, the "M" character may be displayed at a specific position on the display module 1.

Figure 4:
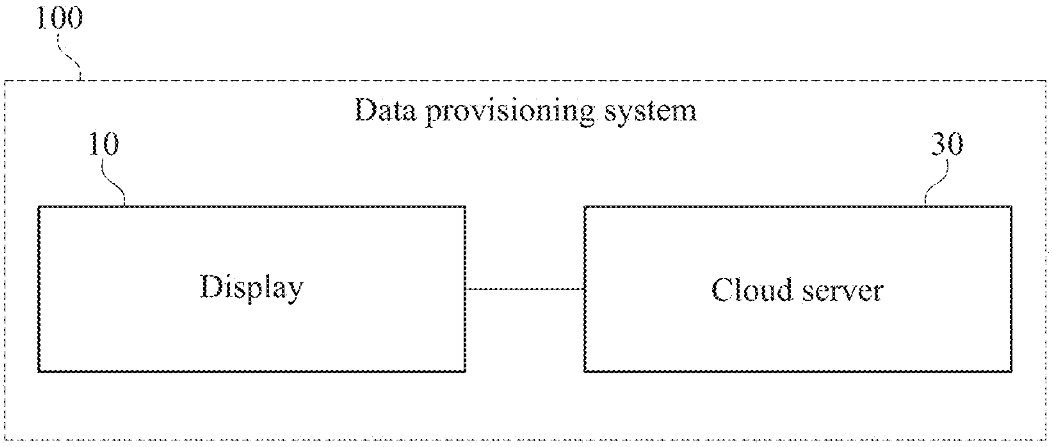
FIG. 4 is a block diagram of the structural framework of a data provisioning system of a display in an embodiment of the present disclosure.

FIG. 4 is a block diagram of the structural framework of a data provisioning system of a display in an embodiment of the present disclosure. As shown in FIG. 4, the data provisioning system 100 of the display in an embodiment of the present disclosure includes the display 10 as described in the previous embodiment, and further includes a cloud server 30.

The cloud server 30 is configured to receive a request associated with the network address and provide equipment data of the display 10 according to the request. In an embodiment, the cloud server 30 is also configured to check the integrity of the network address and the existence of storage space corresponding to the network address. When the network address passes integrity and storage space checks, the cloud server 30 is configured to provide equipment data of the display 10.

Figure 5:
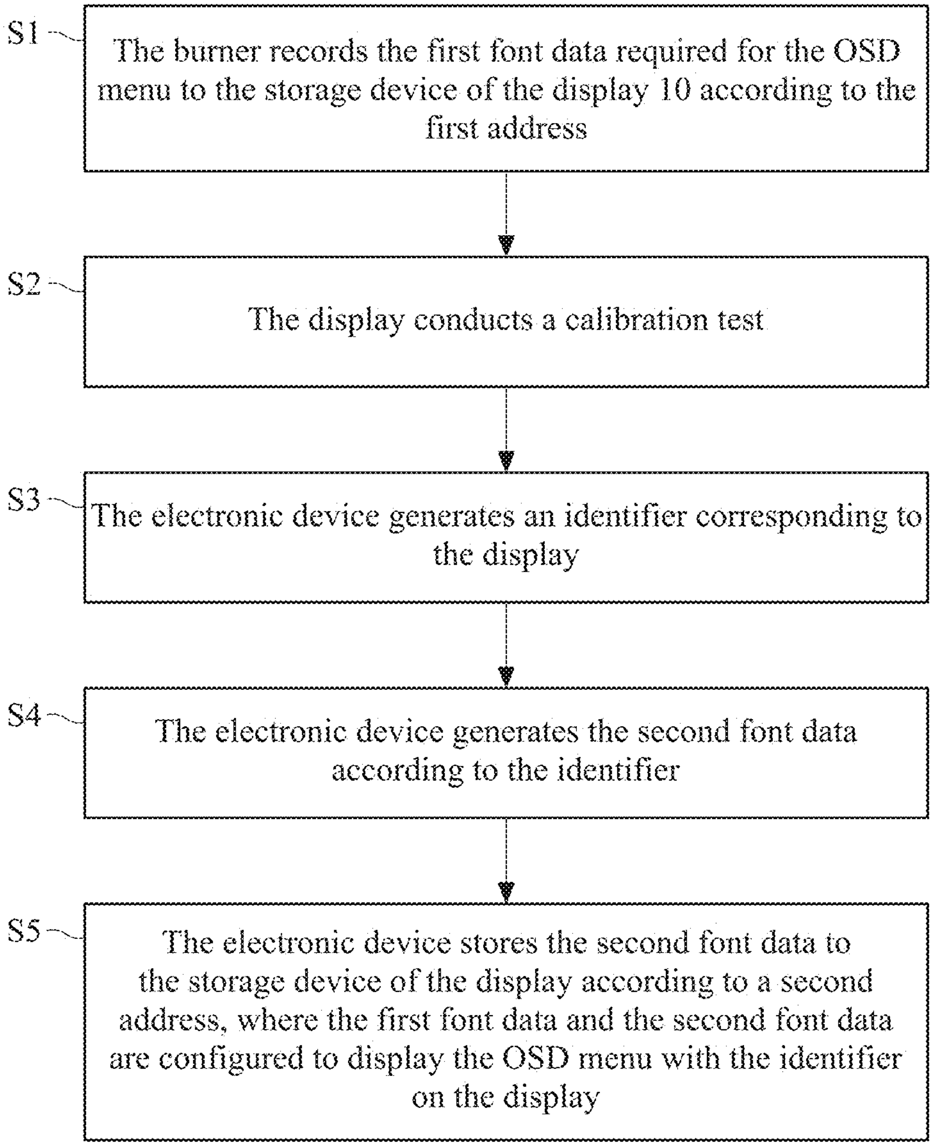
FIG. 5 is a flowchart of the data configuration method of a display in an embodiment of the present disclosure.

FIG. 5 is a flowchart of the data configuration method of the display in an embodiment of the present disclosure. The process shown in FIG. 5 is configured to explain how to produce the display 10 as described in the previous embodiment at the factory.

In Step S1, the burner records the first font data D1 required for the OSD menu G to the storage device 3 of the display 10.

As shown in FIG. 2 and FIG. 3, the OSD menu G (in image format, for example) is first encoded into a font table (first font data D1). The font table is then compiled as part of the firmware F, and the burner records the firmware F into the storage device 3 through In-System Programming (ISP). In this way, the display 10 can operate normally and display the OSD menu G.

In an embodiment, the first font data D1 required for the OSD menu G is the firmware F, pre-recorded in the storage device 3 of the display 10.

In an embodiment, the first font data D1 required for the OSD menu G is recorded into the firmware F along with other data.

In an embodiment, the first font data D1 is recorded into the firmware F or as part of the firmware F, and the firmware F is stored at the first address of the storage device 3.

In Step S2, the display 10 conducts a calibration test. After the display 10 completes the calibration test, as shown in Step S3, the electronic device generates an identifier corresponding to the display 10, where the identifier includes the network address. In Step S4, the electronic device generates the second font data D2 according to the identifier. In Step S5, the electronic device stores the second font data D2 to the storage device 3 of the display 10 basing on a second address via commands, where the second address is different from the first address. The first font data D1 and the second font data D2 are configured to display the OSD menu G including the identifier on the display 10. Above-mentioned electronic device is, for example, Realtek ISP (In System Programmable) USB to I2C Jig with APP (Application) tool.

In the actual production scenario at the factory, after the firmware F has been successfully recorded to the display 10, it conducts a production line color calibration (as in Step S2) on the display 10, and then generates the identifier for the current display 10 (the generation method is described later). Since the identifier for each display 10 is unique, and its corresponding font table (second font data D2) is also different, it is not suitable to bind the font table of the identifier with the firmware and then record it to the storage device 3. The approach used in the present disclosure is to independently store a part of the font table required for the OSD menu G (the second font data D2 corresponding to the identifier) outside the firmware F, in a separate region in the storage device 3 (i.e., the region belonging to the second address). Then, using the dynamic loading function of the scalar IC 5, the OSD menu G and the identifier are displayed simultaneously by loading the font table twice. This approach of keeping the font table for the OSD menu G separate from the firmware F is an important feature of the present disclosure.

Figure 6:
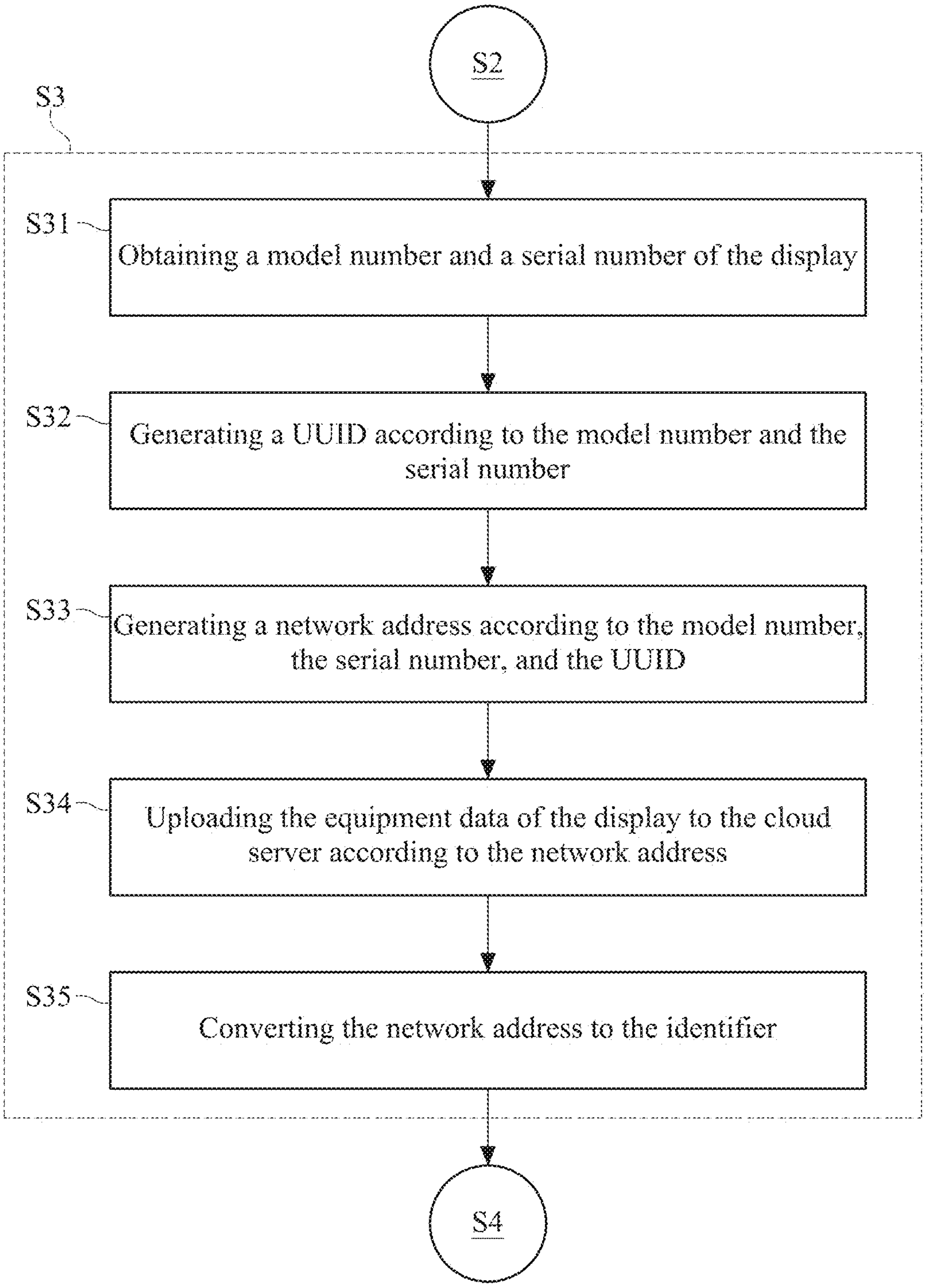
FIG. 6 is a detailed flowchart of a step in FIG. 5.

FIG. 6 is a detailed flowchart of Step S3 in FIG. 5, where the electronic device runs a self-written software program to implement the process described in FIG. 6.

In Step S31, the electronic device obtains a model number and a serial number of the display 10.

In Step S32, the electronic device generates a Universally Unique Identifier (UUID) according to the model number and the serial number. In an embodiment, the electronic device is a personal computer or a cloud server, but the present disclosure does not limit the hardware type of the electronic device. The electronic device can execute the CoCreateGuid function to generate a 128-bit length UUID. This function is an Application Programming Interface (API) provided by the Windows operating system.

In Step S33, the electronic device generates a network address according to the model number, the serial number, and the UUID. An example of the network address is as follows:

http://www.company.com/UUID/Model_SN_data where the UUID represents the universally unique identifier generated in Step S32, and Model and SN respectively represent the model number and the serial number obtained in Step S31.

In Step S34, the electronic device uploads the equipment data of the display 10 to the cloud server 30 basing on the network address.

In Step S35, the electronic device converts the network address to the identifier. In an embodiment, a QR code generator may be configured to convert the uniform resource locator (URL) generated in Step S33 into a QR code in image format.

For each display produced in the factory, after calibration tests with instruments, electronic file reports are generated. The conventional approach is to print these electronic files and place the printed reports in the packaging box of each display. The present disclosure, however, uploads these electronic file reports to the cloud server 30 through the "UUID+Model+SN" path.

Figure 7:
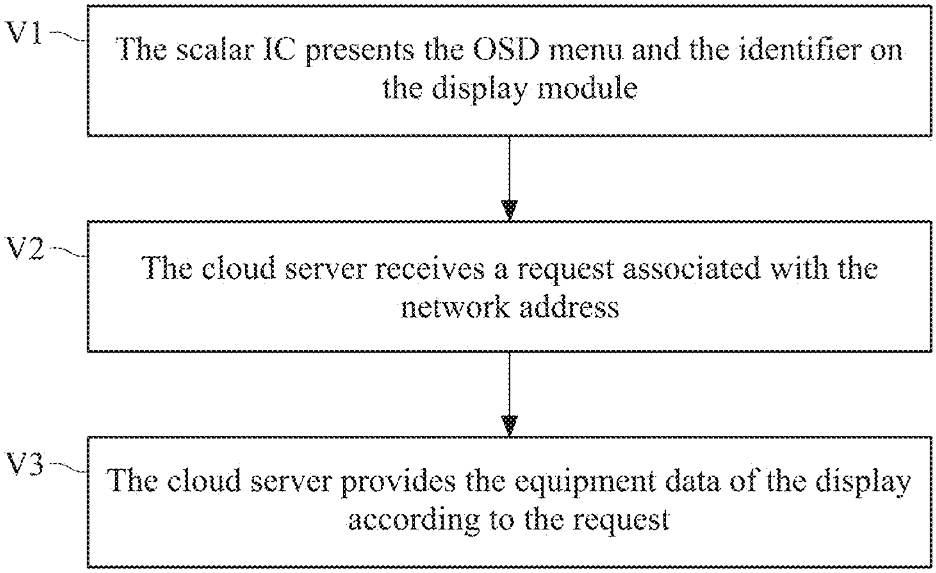
FIG. 7 is a flowchart of the data configuration method of the display in an embodiment of the present disclosure.

FIG. 7 is a flowchart of the data configuration method of the display device in an embodiment of the present disclosure. As shown in FIG. 7, the data configuration method of the display device in this embodiment includes steps V1 to V3.

In Step V1, the scalar IC 5 presents the OSD menu G and the identifier on the display module 1, where the identifier includes the network address. In an embodiment, the scalar IC 5 reads the storage device 3 of the display 10 basing on the first address to load the first font data D1 required for the OSD menu G, and then reads the storage device 3 of the display 10 basing on the second address to load the second font data D2 required for the identifier.

In Step V2, the cloud server 30 receives a request associated with the network address. In Step V3, the cloud server 30 provides the equipment data of the display 10 according to the request. In an embodiment, when a user wants to confirm the equipment data of the display 10, he/she may activate the OSD menu G of the display 10 and use a communication device (such as a smartphone or tablet, the present disclosure does not limit the hardware type of the communication device) to scan the identifier presented in the OSD menu G. The communication device obtains the network address of the equipment data by scanning the identifier, and then connects to the cloud server 30 basing on the network address to obtain the equipment data of the display 10.

Figure 8:
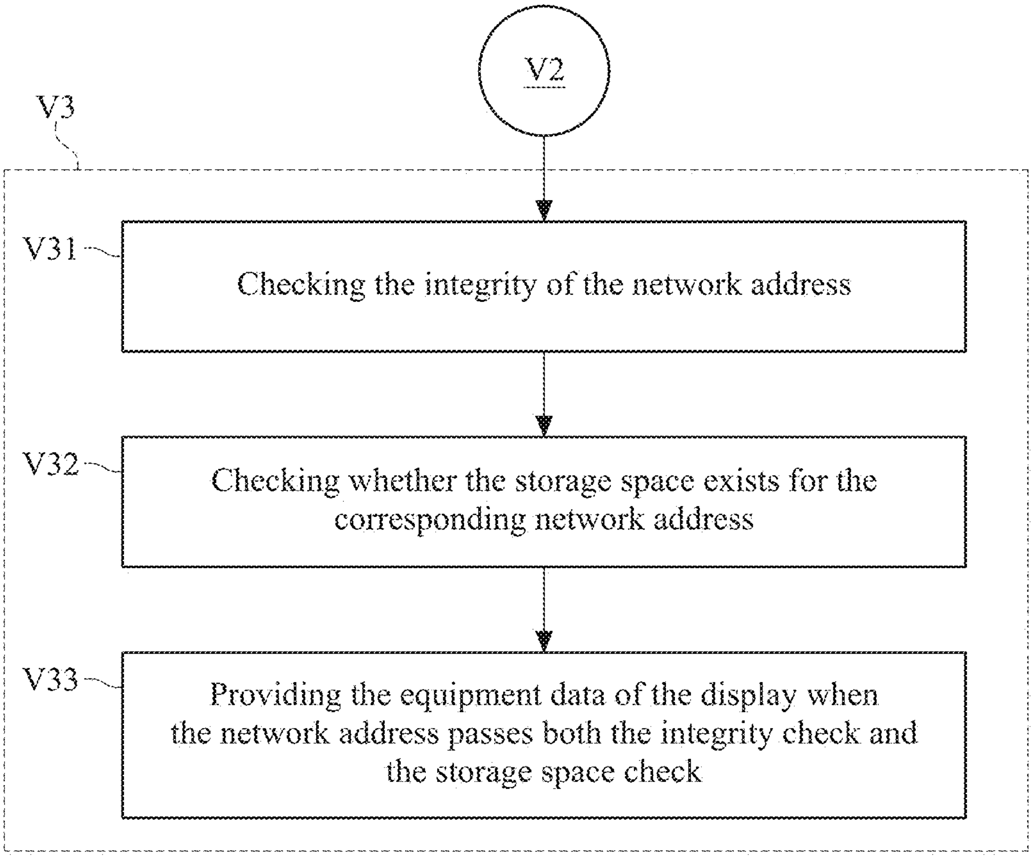
FIG. 8 is a detailed flowchart of a step in FIG. 7.

FIG. 8 is a detailed flowchart of Step V3 in FIG. 7. In Step V31, the cloud server 30 checks the integrity of the network address, where the integrity check involves verifying whether the network address contains a UUID of a specified length, a complete display model number, and a complete display serial number. If any of these conditions is not met, the integrity check fails. In Step V32, the cloud server 30 checks whether the storage space exists for the corresponding network address. In Step V33, when the network address passes both the integrity check and the storage space check, the cloud server 30 provides the equipment data of the display 10.

Overall, in this embodiment, a secure access mechanism is established on the cloud server 30 to ensure the security of the equipment data of the display 10. Users are only allowed to obtain the corresponding equipment data by providing a complete and legitimate URL, otherwise, viewing is not permitted.

Since the equipment data uploaded to the cloud for each display is stored in different UUID folders, after establishing a secure access mechanism on the cloud server 30, users may only view the equipment data of the display by scanning the identifier. Due to the uniqueness of the UUID, users cannot access the equipment data of other displays by modifying the network address corresponding to the identifier, as users cannot guess the UUID corresponding to other displays. This ensures the uniqueness of the data for each display and prevents unauthorized access to cloud data.

Two application examples of the present disclosure are listed below:

Example 1: Since many users are unfamiliar with certain functions in the OSD menu of the display, instructional videos on these functions or troubleshooting may be recorded and stored on the cloud server for users to watch. This allows users to easily experience new features and quickly resolve common issues.

Example 2: Firmware updates for high-end displays are frequent. The new firmware update files and update records are stored on the cloud server, allowing users to promptly obtain and update the display firmware according to their needs.

In summary, the present disclosure achieves secure and efficient data access through cloud data combined with an identifier in the OSD menu. The present disclosure provides a secure network address for users to access. In practical applications, the cloud server also provides a user interface (UI) to offer users various types of equipment data for selection and viewing when accessing. The equipment data may include displayed videos, troubleshooting methods for common problems, etc. When design changes occur, relevant documents may be quickly updated, allowing users to obtain the latest information and ensuring the accuracy of the data, significantly enhancing the user experience. In addition, the present disclosure may save paper and manpower required for printing paper documents in the factory, contributing to energy conservation and carbon reduction, and providing significant environmental benefits in terms of environment, social and governance (ESG) assessments for enterprises.

What is claimed is:

1. A display, comprising:

a display module;

a storage device storing first font data and second font data; and a scalar integrated circuit electrically connected to the display module and the storage device, wherein the scalar integrated circuit loads the first font data and the second font data from the storage device, displays an On Screen Display (OSD) menu on the display module according to the first font data, and presents an identifier in the OSD menu according to the second font data, wherein the identifier is generated based on a network address, and the network address is configured to access equipment data of the display;

wherein the network address is generated according to a model number and a serial number of the display and a universally unique identifier associated with the display, the universally unique identifier is generated according to the model number and the serial number, and the equipment data are uploaded to a cloud server based on the network address.

2. The display of claim 1, wherein the equipment data comprises: at least one of a driver, a calibration report, a manual, a quick start guide, and an instructional video.

3. The display of claim 2, wherein the calibration report is color calibration data generated during a production line stage of a display production process, where a color calibration is performed on the display to generate the color calibration data.

4. The display of claim 3, wherein the production line stage is entered after the first font data is recorded to the storage device of the display.

5. The display of claim 1, wherein the identifier is a QR code.

6. The display of claim 1, wherein the first font data is recorded as firmware or as a part of the firmware, and the firmware is stored at a first address of the storage device.

7. The display of claim 6, wherein the second font data is stored at a second address to the storage device, the second address is different from the first address, and the storage device is a flash memory.

8. The display of claim 1, wherein the network address is obtained via scanning the identifier by a communication device, and the equipment data is obtained based on the network address.

9. The display of claim 8, wherein the equipment data is stored on a cloud server.

* * * * *